United States Patent
Witt et al.

(10) Patent No.: US 12,294,260 B2
(45) Date of Patent: May 6, 2025

(54) ELECTRIC MACHINE, DISPLACEMENT DEVICE FOR AN ELECTRIC MACHINE, AND POWERTRAIN FOR A MOTOR VEHICLE

(71) Applicant: Schaeffler Technologies AG & Co. KG, Herzogenaurach (DE)

(72) Inventors: Holger Witt, Bühl (DE); Christoph Raber, Ottweiler-Steinbach (DE); Dennis Kuhl, Bühl (DE); Christian Morgen, Haueneberstein (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 203 days.

(21) Appl. No.: 18/007,868

(22) PCT Filed: May 3, 2021

(86) PCT No.: PCT/DE2021/100394
§ 371 (c)(1),
(2) Date: Dec. 2, 2022

(87) PCT Pub. No.: WO2021/244696
PCT Pub. Date: Dec. 9, 2021

(65) Prior Publication Data
US 2023/0231454 A1    Jul. 20, 2023

(30) Foreign Application Priority Data
Jun. 4, 2020   (DE) .................. 102020114855.0

(51) Int. Cl.
*H02K 21/02* (2006.01)
*H02K 7/12* (2006.01)
*H02K 21/24* (2006.01)

(52) U.S. Cl.
CPC .................. *H02K 21/026* (2013.01)

(58) Field of Classification Search
CPC ........ H02K 21/026; H02K 7/12; H02K 21/14; H02K 21/24
(Continued)

(56) References Cited

U.S. PATENT DOCUMENTS

| 8,109,847 B2 | 2/2012 | Rueschel |
| 2008/0265702 A1 | 10/2008 | Yeh |
| 2009/0134723 A1 | 5/2009 | Tekeuchi |

FOREIGN PATENT DOCUMENTS

| CN | 103346639 | 10/2013 |
| DE | 102008059300 | 6/2009 |

(Continued)

*Primary Examiner* — Jose A Gonzalez Quinones
(74) *Attorney, Agent, or Firm* — Volpe Koenig

(57) ABSTRACT

An electric machine designed as a permanently excited synchronous machine, including a rotor with a rotor body arranged on a rotor shaft, a stator, and a displacement device that generates a relative axial movement between the rotor body and the stator based on a torque produced between the rotor shaft and the rotor body. The displacement device has first and second displacement elements and at least one rolling body arranged between the first and second displacement elements. The first displacement element is axially movable and rotatable to a limited degree on the rotor shaft, and the second displacement element is connected to the rotor shaft rotationally fixed. The displacement elements provide that upon rotation of the first displacement element relative to the second or vice versa, the rotor body is pushed on the rotor shaft axially against the spring force.

11 Claims, 5 Drawing Sheets

(58) Field of Classification Search
USPC ............... 310/152, 156.32, 156.46, 191, 261
See application file for complete search history.

(56) References Cited

FOREIGN PATENT DOCUMENTS

| | | | |
|---|---|---|---|
| DE | 102011120434 | 6/2012 | |
| DE | 102017216508 | 3/2019 | |
| EP | 1401087 | 3/2004 | |
| EP | 1653595 | 5/2006 | |
| EP | 1653595 A1 * | 5/2006 | ........... H02K 21/026 |
| EP | 2985893 | 2/2016 | |
| JP | 2007244023 A * | 9/2007 | |
| JP | 5135693 | 11/2012 | |

* cited by examiner

ELECTRIC MACHINE, DISPLACEMENT DEVICE FOR AN ELECTRIC MACHINE, AND POWERTRAIN FOR A MOTOR VEHICLE

CROSS-REFERENCE TO RELATED APPLICATIONS

This application is the U.S. National Phase of PCT Appln. No. PCT/DE2021/100394, filed May 3, 2021, which claims the benefit of German Patent Appln. No. 10 2020 114 855.0, filed Jun. 4, 2020, the entire disclosures of which are incorporated by reference herein.

TECHNICAL FIELD

The present disclosure relates to an electric machine designed as a permanently excited synchronous machine, comprising a rotor having at least one rotor body which is arranged on a rotor shaft, having a plurality of magnet elements designed as permanent magnets, and a stator. The at least one rotor body and the stator are arranged to be axially movable relative to one another along the axis of rotation X of the rotor of the electric machine. The at least one rotor body is acted upon by a spring force directed away from the stator in the axial direction via a spring element. Furthermore, the electric machine comprises at least one displacement device, which is designed to generate the relative axial movement between the at least one rotor body and the stator as a function of a torque occurring between the rotor shaft and the at least one rotor body in the direction of the stator. In addition, the disclosure relates to a displacement device for an electric machine and a drive train for a motor vehicle.

BACKGROUND

Axial flow machines are already well known in the prior art.

An electric axial flow machine having a stator and a rotor is known from EP 2 985 893 A1, wherein the stator comprises at least two stator segments, and wherein the rotor is connected to a rotor shaft, wherein the rotor and/or the rotor shaft are rotatably mounted on a bearing, and wherein the stator segments are arranged to be immovable relative to the bearing in the direction of rotation of the rotor. At least one of the stator segments is movably arranged in the axial or radial direction relative to the bearing to adjust the width of the air gap between the rotor and the stator segments.

SUMMARY

It is the object of the present disclosure to provide an electric machine which is improved with regard to torque-dependent field amplification and a displacement device for an electric machine which improves the torque-dependent amplification of the magnetic field.

This object is achieved by an electric machine having one or more of the features disclosed herein, a displacement device having one or more of the features disclosed herein, and a drive train for an electrified motor vehicle having one or more of the features disclosed herein.

An electric machine designed according to the disclosure comprises a rotor having at least one rotor body which is arranged on a rotor shaft and has a plurality of magnet elements designed as permanent magnets, a stator, and a displacement device which is designed to generate the relative axial motion between the at least one rotor body and the stator as a function of a torque occurring between the rotor shaft and the at least one rotor body in the direction of the stator. The at least one rotor body and the stator are arranged to be axially movable relative to one another along the axis of rotation of the rotor of the electric machine. The at least one rotor body is acted upon by a spring force via a spring element directed away from the stator in the axial direction. The at least one displacement device has a first displacement element, a second displacement element and at least one rolling body arranged between the first displacement element and the second displacement element. The first displacement element is arranged to be axially movable and rotatable at least in a limited manner on the axially non-movable rotor shaft. The second displacement element is connected to the rotor shaft in a rotationally fixed and non-movable manner. The first displacement element has a first ramp element on the side thereof facing the second displacement element, and the second displacement element has a second ramp element on the side thereof facing the first displacement element, wherein the first ramp element and the second ramp element are designed such that in the event of a rotation of the first displacement element against the second displacement element or vice versa, the rotor body is pushed axially on the rotor shaft against the spring force. The advantage achieved by the design according to the disclosure is that an axial flow machine is provided in which a torque-dependent field strengthening is realized with structurally simple means.

First, the individual elements of the claimed subject matter of the disclosure are explained in the order in which they are named in the set of claims, and particularly preferred embodiments of the subject matter of the disclosure are described below.

The magnetic flux in an electric axial flow machine (AFM), such as an electric motor vehicle designed as an axial flow machine, is directed axially in the air gap between the stator and rotor to a direction of rotation of the rotor of the axial flow machine. There are different types of axial flow machines. A known type is what is termed an I arrangement, in which the rotor is arranged axially next to a stator or between two stators. Another known type is what is termed an H-arrangement, in which two rotors are arranged on opposite axial sides of a stator.

The stator of an electrical axial flow machine has a stator body having a plurality of stator windings arranged in the circumferential direction. Viewed in the circumferential direction, the stator body can be designed in one piece or in segments. The stator body can be formed from a laminated stator core having a plurality of laminated electrical laminations. Alternatively, the stator body can also be formed from a compressed soft magnetic material, such as what is termed an SMC (soft magnetic composite) material.

A rotatably mounted shaft of an electric machine is referred to as a rotor shaft, with which the rotor or rotor body is coupled in a rotationally fixed manner.

The rotor of an electrical axial flow machine can be designed at least in part as a laminated rotor. A laminated rotor is designed to be layered in the axial direction. The axial magnetic flux must overcome the layers of adhesive or insulation between the stacked individual electrical laminations, as a result of which the magnetic circuit experiences shearing (additional air gap) and loses efficiency. As an alternative, the rotor of an axial flow machine can also have a rotor carrier, which is designed to be fitted with magnetic sheets and/or SMC material and with magnetic elements designed as permanent magnets.

Further advantageous embodiments are specified in the formulated dependent claims. The features listed individually in the disclosure can be combined with one another in a technologically meaningful manner and can define further embodiments. In addition, the features indicated in the claims are specified and explained in more detail in the description, wherein further preferred embodiments are shown.

According to an advantageous embodiment, it can be provided that the spring element is dimensioned in terms of the spring force thereof such that, in the idle state of the electric machine, the at least one rotor body and the stator are pressed against one another by the spring force when the magnetic attraction force that exists therebetween can be spaced apart from one another be a predetermined maximum axial distance, and that the spring force is dimensioned to be at least slightly larger over the entire displacement path than the magnetic force present between the rotor and stator that counteracts the spring force. The advantage of this configuration is that an electric machine with torque-dependent field reinforcement is provided, which does not require an active actuator to move the rotor and/or stator.

According to a further preferred development, it can also be provided that the electric machine is designed as an axial flow machine, in particular as an axial flow machine in an H arrangement, having a first rotor body connected to the first displacement element and having a rotor body connected to the further first displacement element second rotor body. As a result, a structurally simple structure is created with a small space requirement.

Furthermore, according to a likewise advantageous embodiment, provision can be made for first stop means to be provided, which is respectively designed and arranged such that in an operating state there is a maximum torque between the rotor shaft and the rotor body, the torque that occurs being transmitted via the stop means instead of via the corresponding first and second ramp elements of the first and second displacement element. For this purpose, first stop means can be provided between the rotor shaft or the second displacement element of the first displacement device fixedly connected to the rotor shaft and the first rotor body arranged to be axially movable on the rotor shaft or the first displacement element of the first displacement device connected to the first rotor body. Furthermore, similarly, first stop means can also be provided between the rotor shaft or the second displacement element of the second displacement device, which is fixedly connected to the rotor shaft, and the second rotor body, which is arranged to be axially movable on the rotor shaft, or the first displacement element of the second displacement device, which is connected to the second rotor body. The advantageous effect of this configuration is based on the fact that the wear on the displacement device is reduced by the ramp elements being relieved by the stop means in the operating state of maximum torque.

According to a further particularly preferred embodiment, provision can be made for second stop means to be provided which, as stationary stop means, limit the axial displacement path of the respective rotor body in the direction of the stator body and ensure that the air gap between the rotor body and stator body is limited to a predetermined minimum. In this way, the effect can be achieved in a structurally simple manner that a minimum air gap between rotor and stator is ensured at all times.

Furthermore, the disclosure can also be further developed such that the first displacement element has at least three first ramp elements and the second displacement element has at least three second ramp elements arranged and designed to correspond to the first ramp elements. The advantage of this configuration is an optimized distribution of forces within the displacement device, so that even larger axial displacement forces can be handled with little friction. The ramp elements are particularly preferably configured in pairs, so that the electric machine can set a corresponding torque-dependent field strengthening independently of the direction of rotation thereof.

In a likewise preferred embodiment variant according to the disclosure, it can also be provided that the at least one first ramp element and the at least one second ramp element are designed such that in a state in which the first displacement element and the second displacement element are not rotated in relation to one another, the respective rotor body and the stator are arranged at a maximum axial distance from each other. As a result, in operating situations with low torque settings, operation that is optimized for the use of the electric machine can be guaranteed.

In another embodiment of the electric machine according to the disclosure, a displacement device is provided between the stator body and stationary stator holder, so that a relative axial displacement between the stator body and stator holder can be implemented as a function of a torque or support torque occurring between the stator body and stator holder.

The electric machine comprises a rotor and a stator having a stator body arranged on a stationary stator holder, wherein the stator body is arranged such that it is axially movable relative to the stationary stator holder along the axis of rotation of the electric machine. Furthermore, a displacement device is provided which is designed to generate the relative axial movement between the stator body and the stationary stator holder as a function of a support torque occurring between the stator body and the stationary stator holder. The displacement device comprises a first displacement element, a second displacement element, and at least one rolling body arranged between the first displacement element and the second displacement element, wherein the first displacement element is arranged to be axially movable and rotatable to at least a limited degree in or on the stator body and the second displacement element is connected to the stationary stator holder in a rotationally fixed and non-movable manner. Thus, the first displacement element here has a first ramp element on the side thereof facing the second displacement element, and the second displacement element here has a second ramp element on the side thereof facing the first displacement element, wherein the first ramp element and the second ramp element are designed such that in the event of a rotation of the first displacement element against the second displacement element or vice versa, the stator body is pushed axially with respect to the fixed stator holder.

The object on which the present disclosure is based is also achieved by a displacement device for an electric machine designed as a permanently excited synchronous machine, wherein the displacement device is designed to effect an axial movement of the stator and/or rotor. For this purpose, the displacement device has a first displacement element, a second displacement element, and at least one rolling body arranged between the first displacement element and the second displacement element. The first displacement element also has a first ramp element on the side thereof facing the second displacement element and the second displacement element has a corresponding second ramp element on the side thereof facing the first displacement element. The first ramp element and the second ramp element are designed such that the two displacement elements are moved axially apart in the event of a rotation of the first displacement element relative to the second displacement element.

As a result, it can be achieved that with structurally simple means, an axial displacement can be implemented for the torque-dependent field reinforcement of the electric machine between the rotor and the stator and/or between the stator body and the stator holder.

Finally, the object on which the disclosure is based can also be achieved by a drive train for a motor vehicle having a traction machine designed as an electric machine, wherein the traction machine is designed as an electric machine according to the disclosure.

BRIEF DESCRIPTION OF THE DRAWINGS

Both the disclosure and the technical field are explained in more detail below with reference to the figures. It should be noted that the disclosure is not intended to be limited by the exemplary embodiments shown. In particular, unless explicitly stated otherwise, it is also possible to extract partial aspects of the substantive matter outlined in the figures and to combine them with other components and knowledge from the present description and/or figures. In particular, it should be noted that the figures and in particular the proportions shown are only schematic. Identical reference symbols indicate the same objects, so that explanations from other figures can also be used.

In the figures.

DETAILED DESCRIPTION

Figure 1:
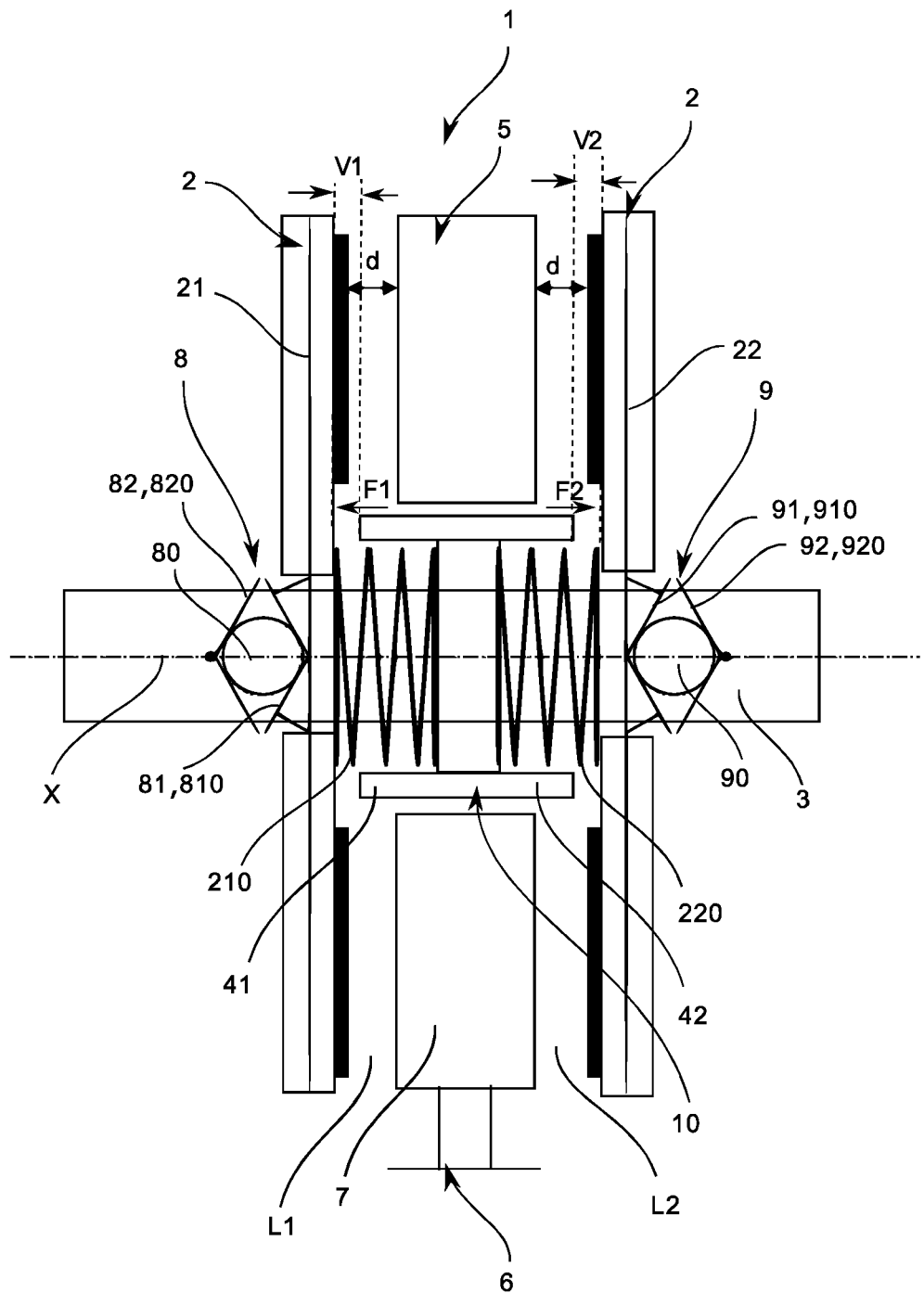
FIG. 1 shows an electric machine constructed as an axial flow machine in an H arrangement according to a possible embodiment in a schematic representation in an axial section, wherein the machine is shown in an operating state with low torque or in the idle state.

FIG. 1 shows an electric machine 1 constructed as an axial flow machine in an H arrangement according to a possible embodiment in a schematic representation in an axial section. The electric machine 1 is shown in a low torque operating state or the rest state. The air gap L1, L2 set between the first and second rotor body 21, 22 and the stator body 7 is at the maximum thereof in this operating state, according to the design of the electric machine 1.

The axial flow machine shown comprises a rotor 2 having a first rotor body 21 arranged on a rotor shaft 3 and having a second rotor body 22 arranged on the rotor shaft 3, wherein each rotor body 21, 22 is arranged such that it is rotatable to a limited degree relative to the rotor shaft 3 and is axially movable thereon, and wherein each of the rotor bodies 21, 22 has a plurality of magnetic elements designed as permanent magnets. Furthermore, the axial flow machine comprises a stator 5 which is arranged in a stationary manner between the rotor bodies 21, 22 and has a stator body 7 which is arranged on a stationary stator holder 6. Each rotor body 21, 22 is acted upon in the axial direction away from the stator 5 by a spring force F1, F2 via a spring element 210, 220, which is supported centrally on a support element 10 arranged between the rotor bodies 21, 22. Thus, the magnetic force F_magnet existing between the rotor body 21, 22 and the stator 5 can be overcome by the opposing spring force F_spring, and the rotor bodies 21, 22 can be kept at a distance from the stator 5 in every operating situation while maintaining an air gap L1, L2. The support element 10 can be arranged in a floating manner on the rotor shaft 3, so that the two rotor bodies 21, 22 support one another. Furthermore, the two rotor bodies 21, 22 can be rotationally coupled via the spring elements 210, 220 and the support element 10 while maintaining a frictional engagement chain. Alternatively, a rotational coupling of the two rotor bodies 21, 22 via pin elements or the like as a positive connection would be conceivable.

The axial flow machine shown comprises, axially on both sides, a displacement device 8, 9 acting between the rotor shaft 3 and the rotor body 21, 22, which is designed to generate the axial movement of the respective rotor body 21, 22 towards the stator 5 as a function of a torque occurring between the rotor shaft 3 and the respective rotor body 21, 22 in the direction of the stator 5. Each displacement device 8, 9 has a first displacement element 81, 91, a second displacement element 82, 92, and at least one rolling body 80, 90 arranged between the first displacement element 81, 91 and the second displacement element 82, 92. Thus, the first displacement element 81, 91 is respectively designed as a carrier for a rotor body 21, 22 and is arranged to be axially movable and rotatable to a limited degree on the rotor shaft 3 arranged to be axially non-movable. The second displacement element 82, 92, on the other hand, is connected to the rotor shaft 3 in a rotationally fixed and non-movable manner.

The respective first displacement element 81, 91 has a first ramp element 810, 910 on the side thereof facing the second displacement element 82, 92-and vice versa, the respective second displacement element 82, 92 has a second ramp element on the side thereof facing the first displacement element 81, 91 ramp element 820, 920. The corresponding ramp elements 810, 820; 910, 920 are designed such that, in the case of a rotation of the first displacement element 81; 91 against the second displacement element 82; 92 or vice versa, the respective rotor body 21, 22 on the rotor shaft 3 is pushed axially against the spring force F1; F2 and the air gap L1; L2 is reduced to strengthen the field.

Figure 2:
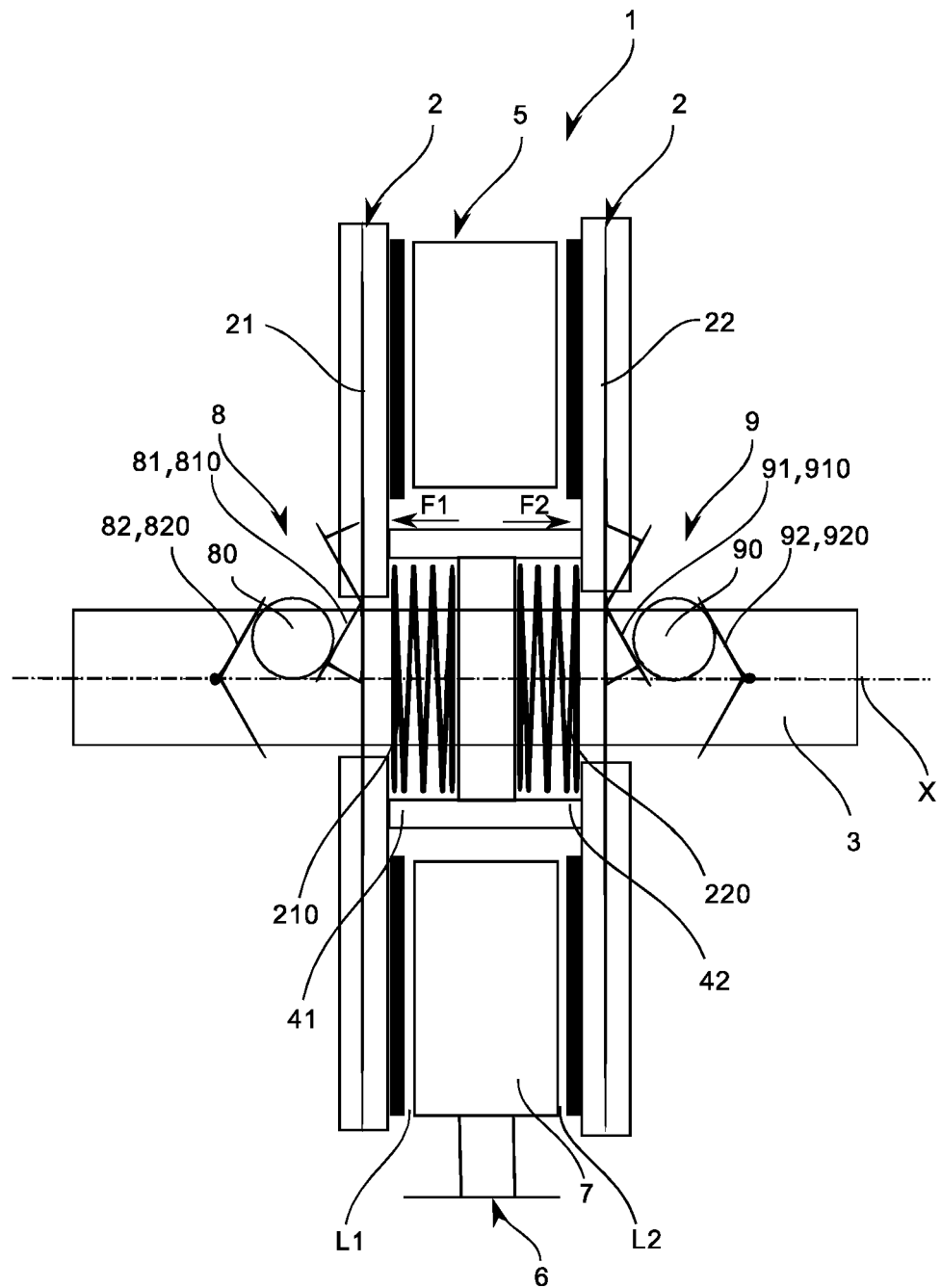
FIG. 2 shows the axial flow machine according to FIG. 1, wherein the machine is shown in the maximum torque operating state.

FIG. 2 shows the axial flow machine in the operating state with maximum torque. The respective air gap L1; L1 is minimal and the maximum field strength is reached. In this operating state, the rotor bodies 21, 22 are limited in the displacement path V1; V2 thereof in the axial direction via second stop means 41; 42 formed on the support element 10. It is clearly seen that, starting from the low torque operating state shown in FIG. 1 at the transition to the operating state of maximum torque shown here in FIG. 2, with the first and second movement means 81, 91; 82, 92 due to the torque-induced rotation of the first displacement element 81; 91 to the second displacement element 82; 92 and the rotor-side support via the respective second displacement element 82; 92 fixedly connected to the rotor shaft 3, a pressing of the rotor bodies 21; 22 takes place in the direction of the centrally arranged stator 5. Due to the fact that the spring force F_spring counteracting the magnetic force F_magnet is dimensioned such that over the entire displacement path V1; V2 the rotor body 21; 22 is only slightly above the magnetic force F_magnet, the displacement forces of the displacement device 8; 9 required to overcome the spring force F_spring.

Figure 3:
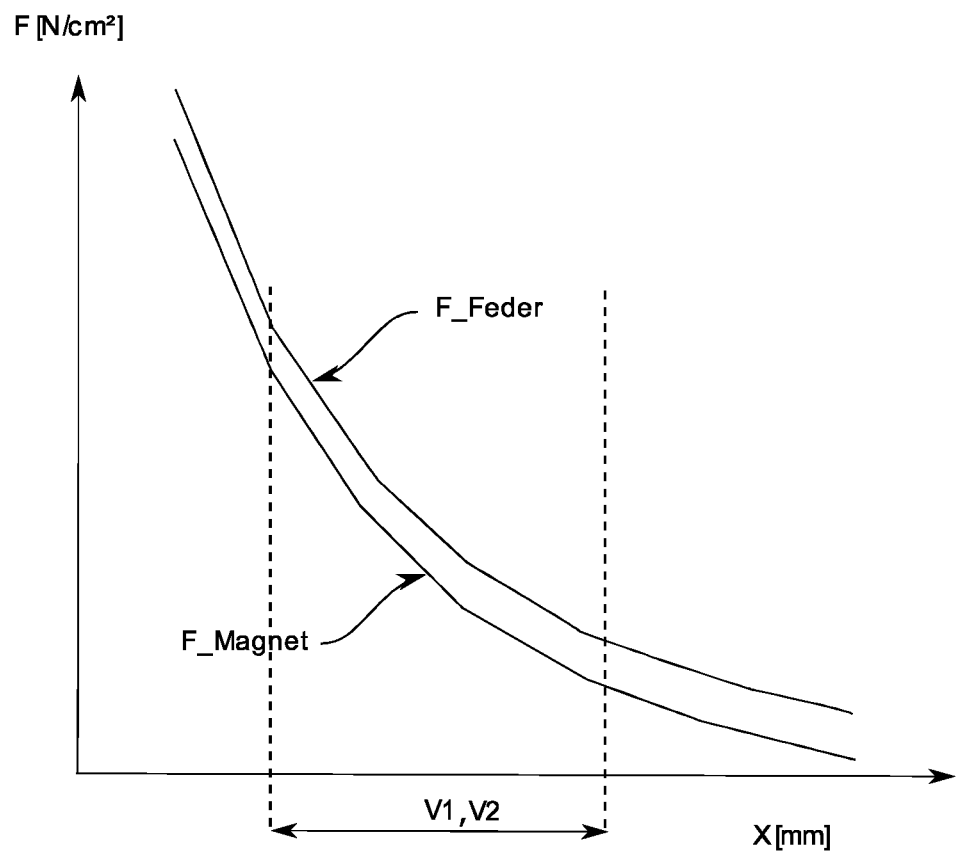
FIG. 3 shows the characteristic curve of the magnetic force between rotor and stator and the characteristic curve of the spring force of the displacement device counteracting the magnetic force.

FIG. 3 shows the characteristic curve of the magnetic force F_magnet between the respective rotor body 21; 22 and the stator 5 as well as the characteristic curve of the spring force F_spring (F1; F2) of the displacement device 8; 9. It is well illustrated that the spring force over the entire displacement path V1; V2 is dimensioned larger than that between the stator and the respective rotor body 21; 22 acting magnetic force F_magnet.

Figure 4:
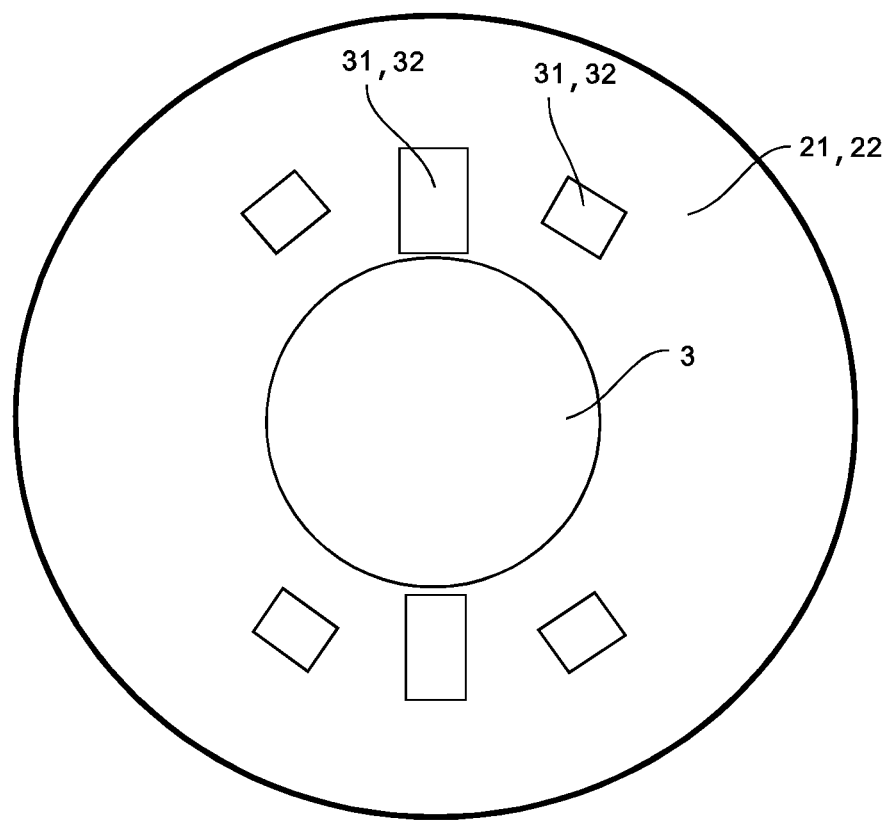
FIG. 4 shows the axial top view of a rotor body with schematically illustrated first stop means for transmitting the torque in the operating state of a predetermined maximum torque.

FIG. 4 shows the axial plan view of a rotor body 21 arranged on the rotor shaft 3; 22 with schematically illustrated first stop means 31; 32 for transmitting the torque in the operating state of a predetermined maximum torque. These stop means 31; 32 are not shown in the other figures for the sake of clarity. As shown, between the rotor shaft 3 and the first or second rotor body 21; 22 that are movable and rotatable to a limited degree on the rotor shaft 3 are provided a first and second stop means 31; 32, which are each designed and arranged such that in an operating state of maximum torque between the rotor shaft 3 and the rotor body 21, 22, the torque that occurs is transmitted via the stop means 31, 32 instead of via the corresponding first and second ramp elements 810, 820; 910, 920 of the first and second displacement element 81, 82; 91, 92.

Figure 5:
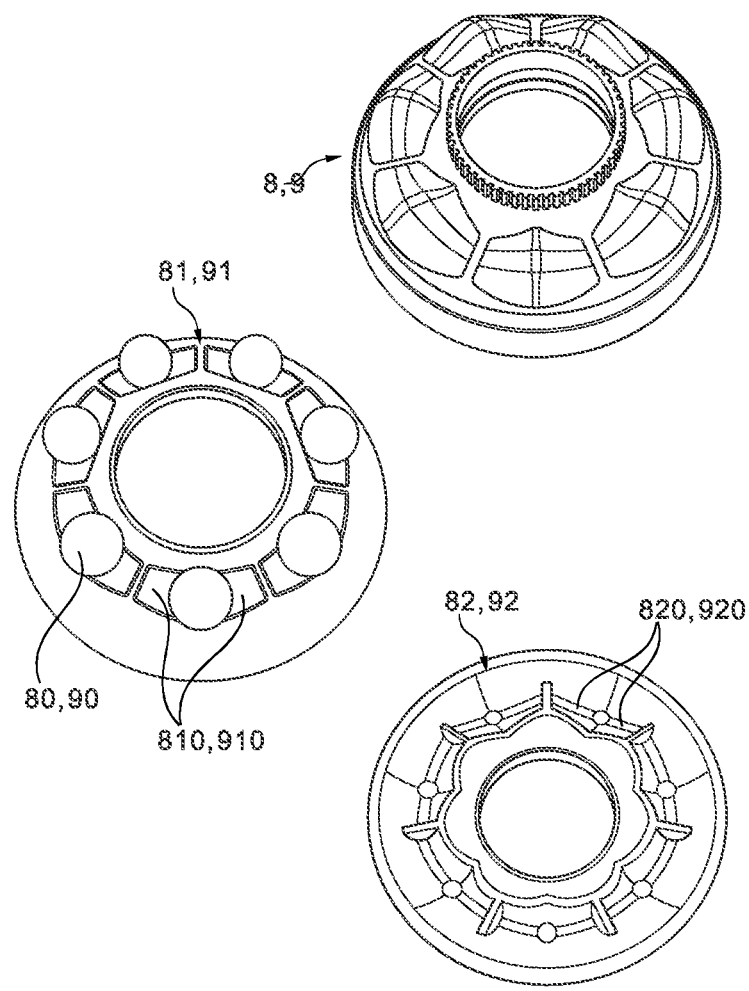
FIG. 5 shows a possible embodiment of a displacement device in different representations.

FIG. 5 shows a possible embodiment of a displacement device 8; 9 in different representations. The illustration on the left shows a displacement device 8; 9 in a perspective view from outside with first and second displacement element 81, 91; 82, 92. The illustration at the top right shows an exemplary embodiment of a first displacement element 81, 91 in the interior view, while the figure at the bottom right shows the complementary second displacement element 82, 92 in the interior view. Overall, each displacement element 81, 91; 82, 82 of a displacement device 8; 9 has seven pairs of ramp elements 810, 910; 820, 920, wherein the ramp elements 810, 910; 820, 920 are designed in pairs such that an axial displacement can basically be initiated by both directions of rotation. Between the corresponding displacement elements 81, 91; 82, 92, there are arranged rolling elements 80; 90 designed as balls.

The disclosure is not limited to the embodiments shown in the figures. The above description is therefore not to be regarded as restrictive, but rather as explanatory. The following claims are to be understood as meaning that a named feature is present in at least one embodiment of the disclosure. This does not exclude the presence of further features. If the patent claims and the above description define "first" and "second" features, this designation serves to distinguish between two features of the same type without defining an order of precedence.

LIST OF REFERENCE SYMBOLS

Electric machine
2 Rotor
21 First rotor body
22 Second rotor body
3 Rotor shaft
5 Stator
6 Stator holder
7 Stator body
8, 9 Displacement device
31, 32 First stop means
41, 42 Second stop means
80, 90 Rolling element
81, 91 First displacement element
82, 92 Second displacement element
810, 910 First ramp element
820, 920 Second ramp element
X Axis of rotation of the rotor
V1, V2 Displacement path
d Distance (rotor body/stator)
L1, L2 Axial air gap
F_spring Spring force
F_magnet Magnetic force

The invention claimed is:

1. An electric machine formed as a permanently excited synchronous machine, comprising:
a rotor having at least one rotor body arranged on a rotor shaft and having a plurality of magnet elements designed as permanent magnets;
a stator;
the at least one rotor body and the stator being arranged axially movable relative to one another along an axis of rotation of the electric machine, and the at least one rotor body being acted upon by a spring force directed away from the stator in the axial direction via a spring element, the spring element being supported by a support element that is arranged in a floating manner on the rotor shaft;
at least one displacement device configured to generate the relative axial movement between the at least one rotor body and the stator as a function of a torque occurring between the rotor shaft and the at least one rotor body in a direction of the stator;
wherein the at least one displacement device has a first displacement element a second displacement element, and at least one rolling body arranged between the first displacement element and the second displacement element;
wherein the first displacement element is arranged axially movable and rotatable at least in a limited manner on the rotor shaft which is axially non-movable, and the second displacement element is connected to the rotor shaft in a rotationally fixed and non-movable manner;
wherein the first displacement element has a first ramp element on a side thereof facing the second displacement element and the second displacement element has a second ramp element on a side thereof facing the first displacement element, and the first ramp element and the second ramp element are arranged such that, upon a rotation of the first displacement element relative to the second displacement element or vice versa, the at least one rotor body is pushed axially on the rotor shaft against the spring force; and
a stop is arranged on an axial end of the support element, which stop acts as stationary stop to limit an axial displacement path of the respective rotor body in a direction of the stator body.

2. The electric machine according to claim 1, wherein the spring element and the spring force thereof is dimensioned such that, when the electric machine is at rest, the at least one rotor body and the stator held in place by the spring force are spaced apart from one another by a predetermined maximum axial distance when a magnetic attraction force existing between them is overcome.

3. The electric machine according to claim 1, wherein the electric machine comprises an axial flow machine having a first said rotor body connected to the first displacement element and having a second said rotor body connected to a further said first displacement element.

4. The electric machine according to claim 3, further comprising another stop arranged such that, in an operating state of maximum torque between the rotor shaft and the rotor bodies, a torque that occurs is transmitted via the another stop instead of via the corresponding first and second ramp elements of the first and second displacement element.

5. The electric machine according to claim 1, wherein the stop is configured to ensure that an air gap between the rotor bodies and the stator body is limited to a predetermined minimum.

6. The electric machine according to claim 3, wherein the first displacement element has at least three said first ramp elements and the second displacement element has at least three said second ramp elements arranged to correspond to the first ramp elements.

7. The electric machine according to claim 3, wherein the at least one first ramp element and the at least one second ramp element are configured such that, in a state in which the first displacement element and the second displacement element are not rotated relative to each other, the respective rotor body and the stator are arranged at a maximum axial distance from one another.

8. An electric machine formed as a permanently excited synchronous machine, comprising:
- a rotor having at least one rotor body arranged on a rotor shaft and having a plurality of magnet elements designed as permanent magnets;
- a stator with a stator body arranged on a stationary stator holder, the stator body being arranged axially movable relative to the stationary stator holder along an axis of rotation of the electric machine;
- displacement means configured to generate relative axial movement between the stator body and the stationary stator holder as a function of a support torque occurring between the stator body and the stationary stator holder;
- the displacement means comprises a first displacement element, a second displacement element, and at least one rolling element arranged between the first displacement element and the second displacement element;
- the first displacement element is arranged to be axially movable and rotatable on the stator body, and the second displacement element is connected to the stationary stator holder in a rotationally fixed and non-movable manner;
- the first displacement element has a first ramp element on a side thereof facing the second displacement element, and the second displacement element has a second ramp element on a side thereof facing the first displacement element; and
- the first ramp element and the second ramp element are arranged such that upon a rotation of the first displacement element relative to the second displacement element or vice versa, the stator body is pushed axially against the stationary stator holder.

9. A displacement device for an electric machine formed as a permanently excited synchronous machine, the displacement device effecting an axial movement of at least one of the stator or rotor, the displacement device comprising:
- a first displacement element;
- a second displacement element; and
- at least one rolling element arranged between the first displacement element and the second displacement element;
- wherein the first displacement element has a first ramp element on a side thereof facing the second displacement element and the second displacement element has a second ramp element on a side thereof facing the first displacement element;
- wherein the first ramp element and the second ramp element are arranged such that upon a rotation of the first displacement element relative to the second displacement element, the two displacement elements are moved axially apart from one another; and
- wherein the first displacement element has at least three said first ramp elements and the second displacement element has at least three said second ramp elements arranged to correspond to the first ramp elements.

10. A drive train for a motor vehicle comprising the electric machine, according to claim 1.

11. The displacement device according to claim 9, wherein the at least one first ramp element and the at least one second ramp element are configured such that, in a state in which the first displacement element and the second displacement element are not rotated relative to each other, the respective rotor body and the stator are arranged at a maximum axial distance from one another.

* * * * *